(12) United States Patent
Hasegawa (10) Patent No.: US 10,680,271 B2
(45) Date of Patent: Jun. 9, 2020

(54) SECONDARY CELL AND METHOD FOR MANUFACTURING SAME

(71) Applicant: NEC CORPORATION, Tokyo (JP)

(72) Inventor: Takuya Hasegawa, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 43 days.

(21) Appl. No.: 15/781,196

(22) PCT Filed: Dec. 16, 2016

(86) PCT No.: PCT/JP2016/087609
§ 371 (c)(1),
(2) Date: Jun. 4, 2018

(87) PCT Pub. No.: WO2017/110684
PCT Pub. Date: Jun. 29, 2017

(65) Prior Publication Data
US 2018/0358645 A1    Dec. 13, 2018

(30) Foreign Application Priority Data
Dec. 22, 2015    (JP) .................................. 2015-249697

(51) Int. Cl.
*H01M 4/02* (2006.01)
*H01M 10/04* (2006.01)
(Continued)

(52) U.S. Cl.
CPC .......... *H01M 10/04* (2013.01); *H01M 4/133* (2013.01); *H01M 4/134* (2013.01); *H01M 4/38* (2013.01);
(Continued)

(58) Field of Classification Search
CPC .................................................. H01M 4/02
See application file for complete search history.

(56) References Cited

U.S. PATENT DOCUMENTS

2014/0349189 A1* 11/2014 Takahata ............... H01M 4/133
429/231.4

FOREIGN PATENT DOCUMENTS

JP    2009-146712 A    7/2009
JP    2010-097730 A    4/2010
(Continued)

OTHER PUBLICATIONS

International Search Report for PCT/JP2016/087609 dated Mar. 21, 2017 [PCT/ISA/210].
Written Opinion for PCT/JP2016/087609 dated Mar. 21, 2017 [PCT/ISA/237].
International Search Report of PCT/JP2016/087609 dated Mar. 21, 2017.

*Primary Examiner* — Jacob B Marks
(74) *Attorney, Agent, or Firm* — Sughrue Mion, PLLC (57) ABSTRACT

The purpose of the present invention is to provide a secondary cell in which a decrease in energy density is inhibited. In order to achieve this purpose, this secondary cell has a positive electrode in which a positive electrode active material layer is provided on a positive electrode collector, and a negative electrode in which a negative electrode active material layer is provided on a negative electrode collector; the positive electrode active material layer and the negative electrode active material layer are laminated so as to face each other with a separator interposed therebetween; the negative electrode active material layer has a greater area than the positive electrode active material layer; and a thin section is provided in at least a part of the negative electrode active material layer at a location where the negative electrode active material layer does not face the positive electrode active material layer.

11 Claims, 6 Drawing Sheets

(51) Int. Cl.
*H01M 4/38* (2006.01)
*H01M 10/0585* (2010.01)
*H01M 4/133* (2010.01)
*H01M 4/134* (2010.01)
*H01M 4/48* (2010.01)
*H01M 10/0525* (2010.01)
*H01M 10/42* (2006.01)

(52) U.S. Cl.
CPC ....... *H01M 4/483* (2013.01); *H01M 10/0413* (2013.01); *H01M 10/0525* (2013.01); *H01M 10/0585* (2013.01); *H01M 2004/025* (2013.01); *H01M 2010/4292* (2013.01); *H01M 2220/20* (2013.01); *Y02E 60/122* (2013.01); *Y02T 10/7011* (2013.01)

(56) References Cited

FOREIGN PATENT DOCUMENTS

| | | | |
|---|---|---|---|
| JP | 2012-038528 A | | 2/2012 |
| JP | 2012-074359 | * | 4/2012 |
| JP | 2012-074359 A | | 4/2012 |
| JP | 2013-175405 A | | 9/2013 |
| JP | 5569645 B2 | | 8/2014 |
| WO | 2008/053880 A1 | | 5/2008 |
| WO | 2009/013890 A1 | | 1/2009 |
| WO | 2012/081465 A1 | | 6/2012 |
| WO | 2016/121734 A1 | | 8/2016 |

* cited by examiner

SECONDARY CELL AND METHOD FOR MANUFACTURING SAME

CROSS REFERENCE TO RELATED APPLICATIONS

This application is a National Stage of International Application No. PCT/JP2016/087609 filed Dec. 16, 2016, claiming priority based on Japanese Patent Application No. 2015-249697 filed Dec. 22, 2015, the disclosure of which is incorporated herein in its entirety by reference.

TECHNICAL FIELD

The present invention relates to a secondary cell in which a positive electrode and a negative electrode are stacked with a separator interposed therebetween, and a method for manufacturing the same.

BACKGROUND ART

In recent years, with a requirement to increase a travel distance per charge for wide use of an electric vehicle (xEV), higher energy density has been strongly requested for a lithium-ion secondary cell which is a power source of the electric vehicle, from a viewpoint of weight reduction.

One means for achieving the higher energy density is to increase capacity of a cell. There is a method of using a solid solution positive electrode material having $Li_2MnO_3$ as a mother structure in a positive electrode, and an alloy mainly including silicon or an oxide thereof as a negative electrode material in a negative electrode (PTL 1).

Silicon indicates a theoretical capacity (4200 mAh/g) far higher than a theoretical capacity (372 mAh/g) of a carbon material currently in practical use, but has not yet been in practical use because a great volume change caused by charging and discharging leads to cell deterioration.

Furthermore, it is described that, in a lithium-ion secondary cell according to PTL 2, a depressed portion 17 is provided on a surface of a negative electrode active material layer on a side contacting a separator, and it is thereby possible to prevent the entire cell from expanding due to expansion of the negative electrode active material layer at a time of charging.

Still further, in a secondary cell according to PTL 3, a large number of stress relaxation spaces, specifically, depressed grooves 133m are formed in a negative electrode active material layer 133 in order to relax stress generated in the negative electrode active material layer 133 due to expansion and contraction at times of charging and discharging. The depressed grooves 133m are pierced between a separator 141 and a negative electrode plate 131.

Yet further, it is described that, in a lithium-ion secondary cell according to PTL 4, progress of a crack and electrode breakdown resulting from charging and discharging can be inhibited by providing a groove in the vicinity of an outer periphery of a main surface of an electrode active material sintered compact.

CITATION LIST

Patent Literature

[PTL 1] Japanese Patent No. 5569645
[PTL 2] Japanese Unexamined Patent Application Publication No. 2009-146712
[PTL 3] Japanese Unexamined Patent Application Publication No. 2012-038528
[PTL 4] Japanese Unexamined Patent Application Publication No. 2013-175405

SUMMARY OF THE INVENTION

Technical Problem

In all of PTLs 2 to 4, a depressed portion is provided on a negative electrode active material layer surface on a side facing a positive electrode active material layer. When a depressed portion is present on a negative electrode facing surface of a positive electrode, a distance between the positive electrode and the negative electrode is greater in the depressed portion than in other places. Accordingly, a metal Li is dendritically separated in the depressed portion, and a short circuit is thus caused between the positive electrode and the negative electrode, which is dangerous. For example, under a low-temperature environment, an Li ion transference number decreases, and Li or an Li compound tends to grow on a negative electrode active material layer in a space between the positive and negative electrodes. Moreover, in a cyclically deteriorated cell, a film mainly resulting from electrolytic solution is formed on a negative electrode active material layer in a space between positive and negative electrodes, Li ion acceptability decreases, and an Li compound therefore tends to be separated. In each case, an Li dendrite grows on the negative electrode active material layer, leading to a short circuit between the positive electrode and the negative electrode.

A silicon-based negative electrode is much greater in cubical expansion resulting from Li ion insertion at a time of charging than a graphite negative electrode, and needs to have a larger area in a facing negative electrode active material layer than in a positive electrode active material layer for the sake of a safe structure of a cell. Therefore, an Li ion is not removed or inserted in a part of a negative electrode that does not face a positive electrode. In other words, an unreacted part is present on the negative electrode active material layer. Cubical expansion three-dimensionally occurs, and the negative electrode active material layer expands not only in a thickness direction thereof but also in an in-plane direction thereof. On the other hand, the unreacted part in which a Li ion is not inserted does not cubically expand. As a result, wrinkling occurs at the boundary between a reaction part and an unreacted part due to volume expansion. Stress resulting from the expansion concentrates particularly in a surface layer at the boundary, and strain is generated in the boundary and a surrounding part thereof due to a charging/discharging cycle. Because of this strain, thickness of the negative electrode active material layer at the boundary increases. Consequently, a volume of the cell increases, and energy density therefore decreases. Particularly in a silicon-based negative electrode having great cubical expansion, an active material layer at a boundary may be detached due to strain in a terrible case, resulting in rapid capacity deterioration.

An object of the present invention is to provide a secondary cell which solves the problem described above and can inhibit a decrease in energy density.

Solution to Problem

The present invention is a secondary cell which includes: a positive electrode in which a positive electrode active material layer is provided on a positive electrode collector;

and a negative electrode in which a negative electrode active material layer is provided on a negative electrode collector, wherein the positive electrode active material layer and the negative electrode active material layer are stacked in such a way as to face each other with a separator interposed therebetween, the negative electrode active material layer has a larger area than the positive electrode active material layer, and a thin section is provided in at least a part of the negative electrode active material layer at a location of the negative electrode active material layer that does not face the positive electrode active material layer.

Furthermore, the present invention is a method for manufacturing a secondary cell which includes: producing at least one electrode stack in which a positive electrode and a negative electrode are stacked with a separator interposed therebetween in such a way that active material layer surfaces face each other, the negative electrode including a thin section in at least a part of a negative electrode active material layer having a larger area than a positive electrode active material layer, at a location that does not face the positive electrode active material layer; wrapping the electrode stack with an outer package except for an injection hole; and injecting electrolyte into the outer package from the injection hole.

Advantageous Effects of the Invention

According to the present invention, it is possible to provide a secondary cell in which a decrease in energy density is inhibited.

BRIEF DESCRIPTION OF THE DRAWINGS

[FIGS. 6(a), 6(b), 6(c) and 6(d)]FIGS. 6(a), 6(b), 6(c) and 6(d) are schematic diagrams illustrating a cross-sectional shape of a trench formed in a negative electrode of an alternative example embodiment of the present invention.

[FIGS. 7(a) and 7(b)]FIGS. 7(a) and 7(b) are schematic diagrams illustrating another cross-sectional shape of a negative electrode of the alternative example embodiment of the present invention.

[FIG. 8]

EXAMPLE EMBODIMENT

Next, one example embodiment of the present invention will be described in detail with reference to the drawings, but the present invention is not limited to this example embodiment.

Figure 1:
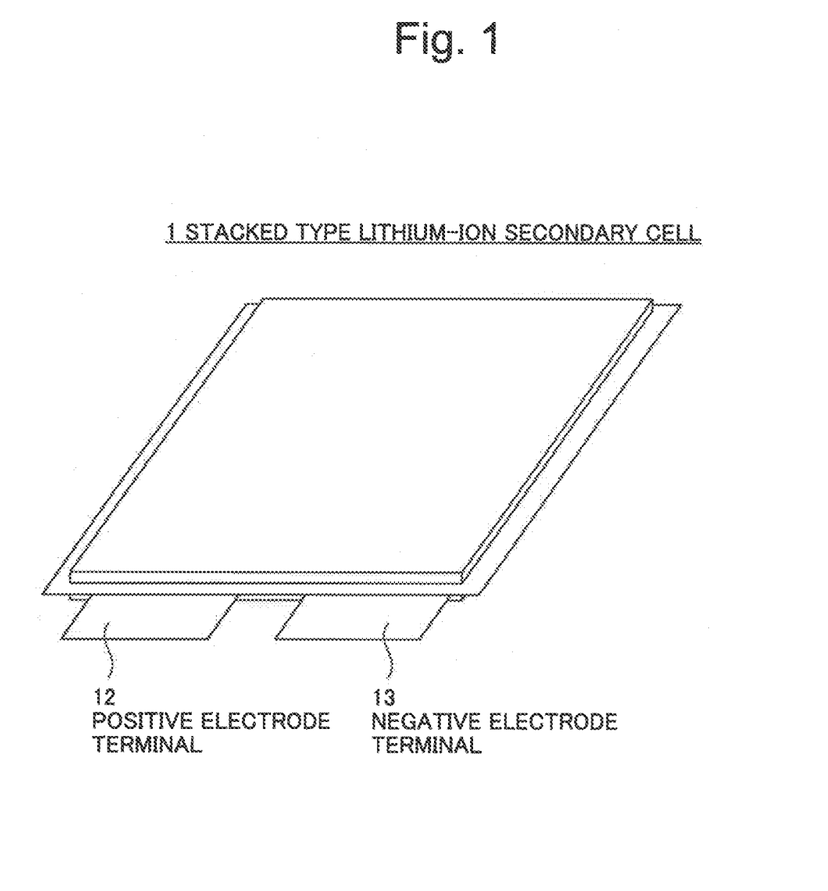
FIG. 1 is an external perspective view of a stacked type lithium-ion secondary cell of an example embodiment of the present invention.
Figure 2:
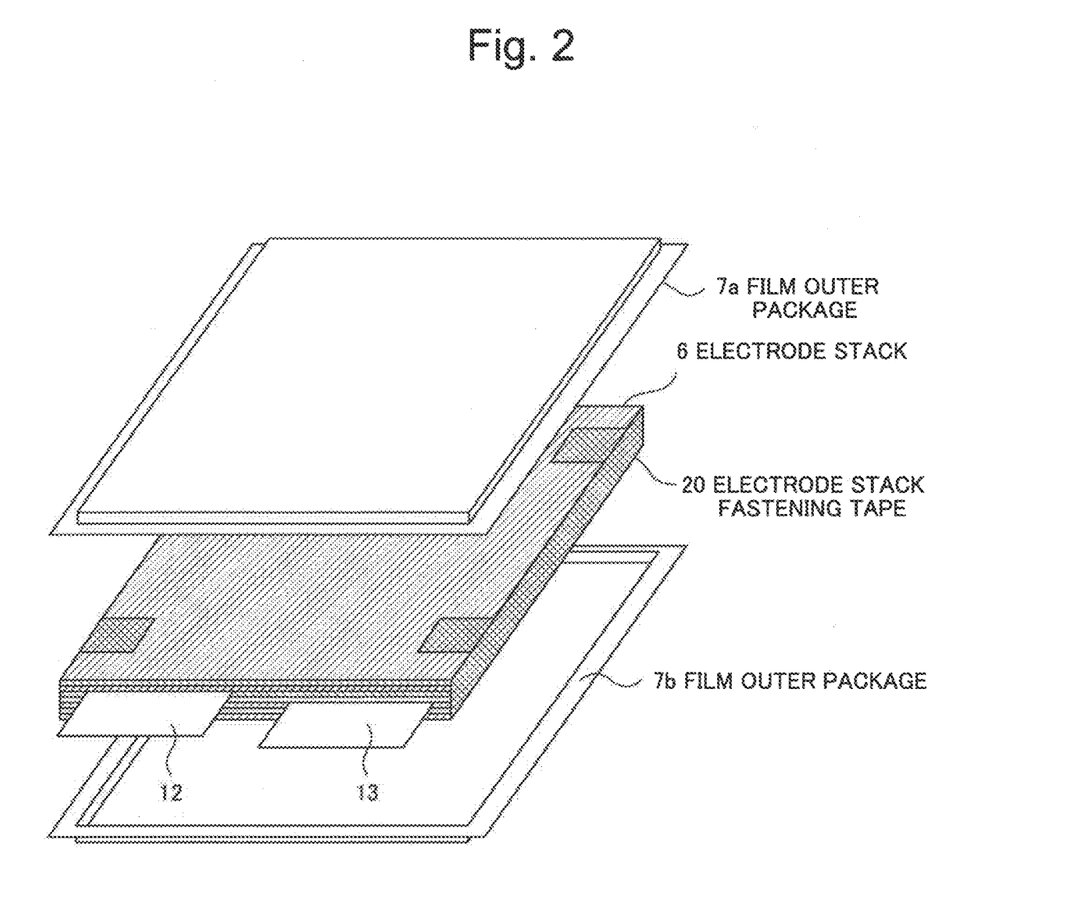
FIG. 2 is a configuration diagram of the stacked type lithium-ion secondary cell of the example embodiment of the present invention.
Figure 3:
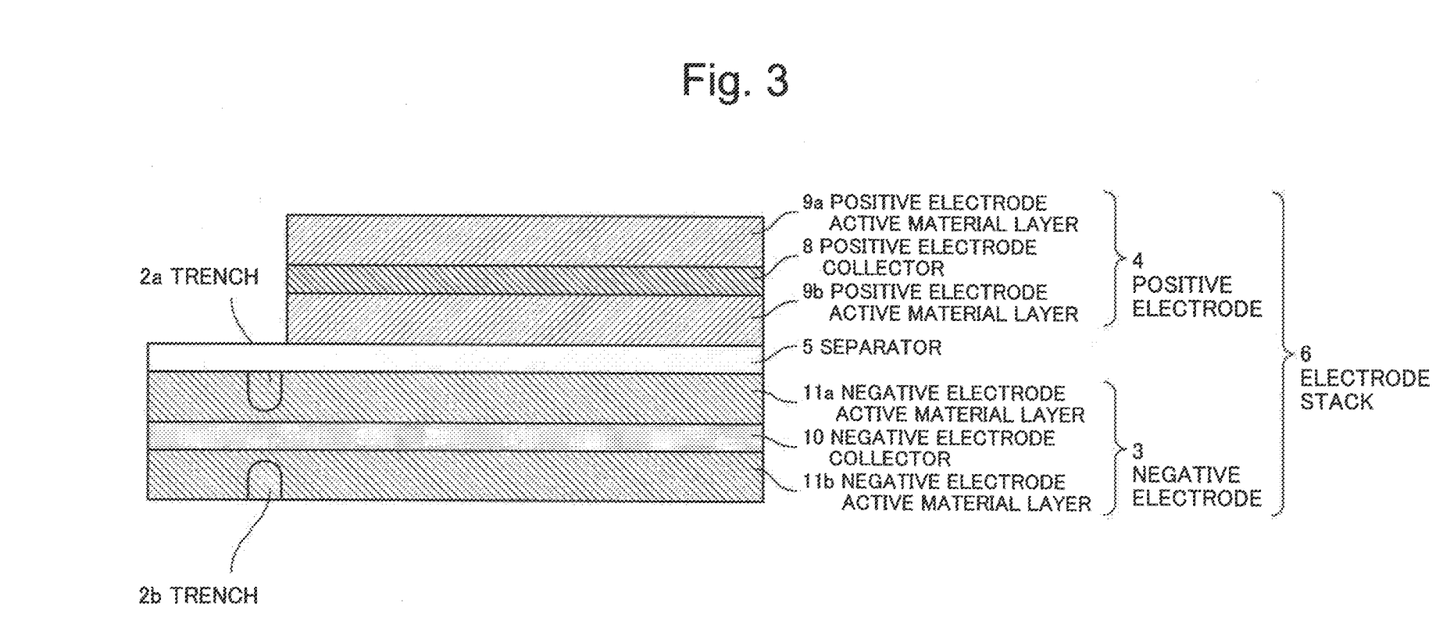
FIG. 3 is a cross-sectional view of an electrode stack of the example embodiment of the present invention.
Figure 4:
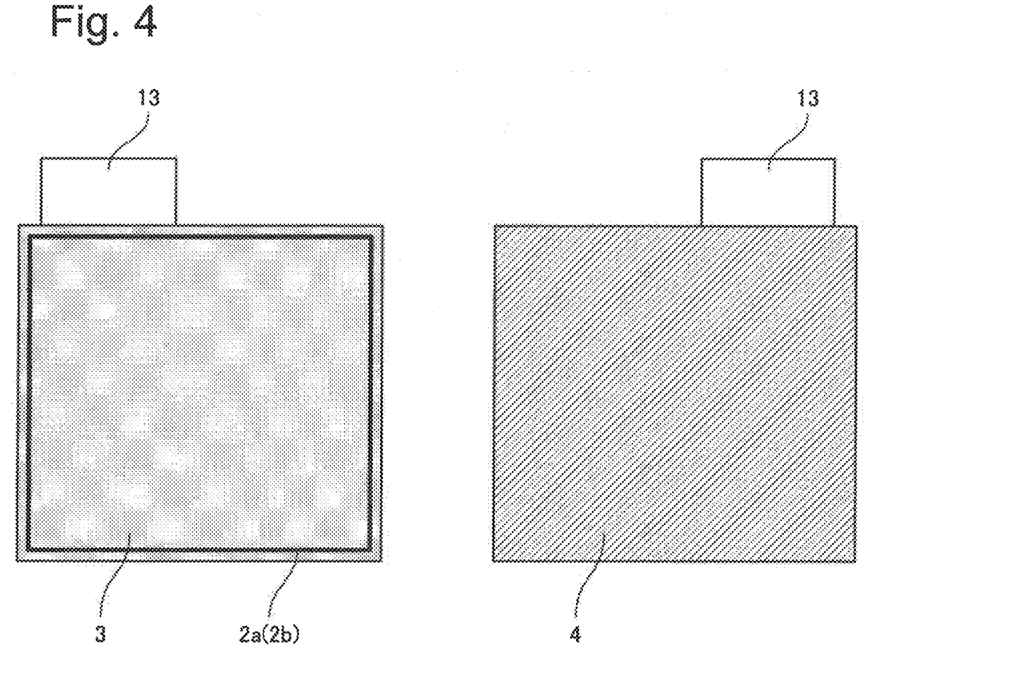
FIG. 4 is a top view of a negative electrode and a positive electrode of the example embodiment of the present invention.

(1) Configuration of Stacked type Nonaqueous Electrolytic Solution Secondary Cell FIG. 1 illustrates an external schematic view of a stacked type lithium-ion secondary cell 1 of one example embodiment of the present invention. FIG. 2 illustrates a configuration schematic view of the stacked type lithium-ion secondary cell 1. Further, FIG. 3 illustrates a cross-sectional view of an electrode stack 6 which is stored in the stacked type lithium-ion secondary cell 1, and in which a negative electrode 3 having a thin section (trenches 2a and 2b in the present example embodiment) in a negative electrode active material layer and a positive electrode 4 are stacked with a separator 5 interposed therebetween. FIG. 4 illustrates a top view of the negative electrode 3 having the trenches 2a and 2b, and the positive electrode 4.

As illustrated in FIG. 2, the stacked type lithium-ion secondary cell 1 of the present example embodiment is configured by interposing the electrode stack 6 between film outer packages 7a and 7b. The electrode stack 6 is a stack in which the negative electrode 3 having the trenches 2a and 2b in the negative electrode active material layer, and the positive electrode 4 are stacked with the separator 5 interposed therebetween. The electrode stack 6 is bound with an electrode stack fastening tape 20. The film outer packages 7a and 7b have resin layers. The stacked type lithium-ion secondary cell 1 is produced, for example, as below from the electrode stack 6 and the film outer packages 7a and 7b. The electrode stack 6 is interposed between the film outer packages 7a and 7b, an injection hole is then provided on a side of each of the film outer packages 7a and 7b other than a side where a positive electrode terminal 12 and a negative electrode terminal 13 are present, and three sides other than the side where the injection hole is present are thermally welded. Then, electrolytic solution is injected in such a way that positive and negative terminal side is on a lower side or a side different from the terminal side is on an upper side. Finally, the side where the injection hole is present is thermally welded for completion. For example, highly anti-corrosive aluminum stacked films are used for the film outer packages 7a and 7b having the resin layers. Note that both ends of the side where the injection hole is formed may also be thermally welded, and the injection hole may be thus narrowed. Moreover, the positive electrode terminal 12 and the negative electrode terminal 13 are provided on the same side in FIG. 2, but may be provided on separate sides.

The positive electrode 4 in which positive electrode active material layers 9a and 9b are provided on both surfaces of a positive electrode collector 8, and the negative electrode 3 in which negative electrode active material layers 11a and 11b having a larger area than the positive electrode active material layers 9a and 9b are provided on both surfaces of a negative electrode collector 10 are prepared. The trenches 2a and 2b are provided at locations of the negative electrode active material layers 11a and 11b which do not face the positive electrode 4. The positive electrode 4 and the negative electrode 3 are stacked with the separator 5 interposed therebetween, and the electrode stack 6 illustrated in FIG. 3 is thus formed. For example, metal foil including aluminum as a main component is used for the positive electrode collector 8, and, for example, metal foil including copper or iron as a main component is used for the negative electrode collector 10.

Furthermore, the positive electrode terminal 12 and the negative electrode terminal 13 are provided in the electrode stack 6, and these electrode terminals are interposed between the film outer packages 7 and then drawn outward. Both surfaces of each of the positive electrode terminal 12 and the negative electrode terminal 13 may be coated with resin in order to improve thermal bondability of, for example, the positive electrode terminal 12 and the negative electrode terminal 13 to the film outer package 7. For such resin, a material highly adhesive to a metal used for an electrode terminal is used.

The trenches 2a and 2b provided in the negative electrode 3 are located 0.1 mm or more and 2 mm or less outward from each side of the positive electrode 4 (an end of the positive electrode active material layer) facing the negative electrode 3. Further, depth of the deepest portion of the trench 2a is 10% or more and 90% or less of the thickness of the negative electrode active material layer 11a from the surface of the negative electrode active material layer 11a. Similarly, depth of the deepest portion of the trench 2b is 10% or more and 90% or less of the thickness of the negative electrode active material layer 11b from the surface of the negative electrode active material layer 11b. In addition, the trenches 2a and 2b are desirably provided on all the sides of the negative electrode 3, but may be provided on only one side or in only one portion of one side.

At 0.1 mm or less from the end of the positive electrode active material layer, there is a problem that positioning of the positive electrode and the negative electrode during stacking becomes difficult. Moreover, when an area of the negative electrode active material layer is excessively large as compared with an area of the positive electrode active material layer, unreacted parts increase. Therefore, unnecessary volume increases, leading to a decrease in volumetric efficiency, and a decrease in energy density. A suitable positive electrode/negative electrode gap (a distance from the end of each positive electrode active material layer to the end of the negative electrode active material layer when the positive electrode is laid on the negative electrode) determined in consideration of the above is not particularly limited, but is desirably 2 mm or less when efficiency in manufacture such as energy density and positioning and cost are considered. Accordingly, a position of a trench is also 2 mm or less. Thus, the positive electrode/negative electrode gap is preferably 0.1 mm or more and 2 mm or less. For stress relaxation, the positive electrode/negative electrode gap is more preferably 0.1 mm or more and 1 mm or less which is closer to the end of the positive electrode active material layer, and is further preferably 0.1 mm or more and 0.8 mm or less. Note that, unless positioning of the positive electrode and the negative electrode during stacking is difficult, wall surfaces of the trenches 2a and 2b are desirably situated immediately under the end of the positive electrode active material layer (0 mm from the end of the positive electrode active material layer). In addition, the positions of the trenches 2a and 2b may be slightly out of alignment when viewed from above, or the trenches 2a and 2b may be different in shape.

Furthermore, when depths of the deepest portions of the trenches 2a and 2b are 10% or less of the thicknesses of the negative electrode active material layers 11a and 11b, effect of relaxing stress is low. When the depths are 90% or more, there is concern that the negative electrode collector 10 might be exposed, at which the negative electrode active material layer might be divided. In other words, the depths are preferably 10% or more and 90% or less, more preferably 20% or more and 50% or less, and further preferably 30% or more and 50% or less.

In this way, it is possible to lessen concentration of stress resulting from cubical expansion in a boundary between a reacted part and an unreacted part, generation of strain in the boundary and a surrounding part thereof due to a charging/discharging cycle, and an increase in the thickness of the negative electrode active material layer at the boundary.

Consequently, it is possible to provide a secondary cell in which a decrease in energy density is inhibited and yet a cycle life is improved. Moreover, in a negative electrode such as a silicon-based negative electrode having great cubical expansion, the thickness of a negative electrode active material layer at a boundary is increased, and an active material layer is therefore detached in some cases, but this can also be inhibited. The thickness of a negative electrode at a boundary is increased for the following reason. A negative electrode active material layer (reacted part) facing a positive electrode active material layer expands three-dimensionally, i.e., in an in-plane direction and a thickness direction. Due to the expansion, a negative electrode active material layer (unreacted part) that does not face a positive electrode active material layer is pressed in the in-plane direction. However, the unreacted part is bonded to the base negative electrode collector, and therefore resists force (stress) of pressing in the in-plane direction. The reacted part at the boundary expands in the thickness direction in an effort to eliminate stress. Particularly when a silicon-based negative electrode active material layer having great cubical expansion extremely expands, an unreacted part is detached in a boundary between a reacted part and the unreacted part. Note that the boundary is located in the negative electrode active material layers 11a and 11b substantially immediately under the end of the positive electrode active material layer.

(2) Description of Constituent Materials

[Film Outer Package]

A metal layer as a base material having resin layers provided on front and back surfaces can be used for the film outer package 7. For the metal layer, it is possible to select a material having a barrier property of preventing leakage of electrolytic solution and external entrance of water content or the like, and it is possible to use aluminum, stainless steel, or the like. A heat-fusible resin layer such as modified polyolefin is provided on at least one surface of the metal layer. Further, a heat-fusible resin layer is provided on the electrode stack 6 side of each of the film outer packages 7a and 7b, the heat-fusible resin layers are put face to face with each other, periphery of a part storing the electrode stack 6 is heat-fused, and an outer container is thereby formed. A resin film such as a nylon film or a polyester film can be provided on an outer package surface which is a surface opposite to a surface where the heat-fusible resin layer is formed.

[Nonaqueous Electrolytic Solution]

In the present example embodiment, nonaqueous electrolytic solution is used as electrolytic solution. Nonaqueous electrolytic solution is produced by dissolving electrolyte salt into nonaqueous solvent. For example, the following organic solvents can be used as the nonaqueous solvent. Specifically, it is possible to singly use one kind or use a mixture of two or more kinds from the followings: annular carbonates such as ethylene carbonate, propylene carbonate, vinylene carbonate, and butylene carbonate; chain carbonates such as ethyl methyl carbonate (EMC), diethyl carbonate (DEC), dimethyl carbonate (DMC), and dipropyl carbonate (DPC); aliphatic carboxylic acid esters; γ-lactones such as γ-butyrolactone; and organic solvents such as chain ethers, annular ethers, a fluorine compound, and a phosphoric acid compound. Lithium salt which is one kind of electrolyte salt, a functional additive, or the like can be dissolved into these organic solvents.

[Positive Electrode and Negative Electrode]

When M is a transition metal, a positive electrode active material of the present invention includes, for example, a layered oxide-based material such as $Li_2MO_3$—$LiMO_2$, $LiCoO_2$, $LiNiO_2$, $LiNiO_2$, $LiNi_{(1-x)}CoO_2$, $LiNi_x(CoAl)_{(1-x)}O_2$, and $LiNi_{1/3}Co_{1/3}Mn_{1/3}O_2$; a spinel-based material such as $LiMn_2O_4$, $LiMn_{1.5}Ni_{0.5}O_4$, and $LiMn_{(2-x)}M_xO_4$; an olivine-based material such as $LiMPO_4$; an olivine fluoride-based material such as $Li_2MPO_4F$ and $Li_2MSiO_4F$; and a vanadium oxide-based material such as $V_2O_5$. One kind or a mixture of two or more kinds can be used from the above materials. Preferably, $Li_2MO_3$—$LiMO_2$ which can obtain higher energy density is used, and charging capacity per positive electrode active material in the case of charging at an initial charging voltage of 4.5 V (vs. $Li^+/Li$) or more is desirably 250 mAh/g or more.

A positive electrode active material is not particularly limited as long as a material which can occlude and release lithium is used, and a positive electrode active material can be selected from several viewpoints. From a viewpoint of higher energy density, it is preferable to contain a large capacity compound. A large capacity compound includes lithium nickel oxide ($LiNiO_2$) or a lithium-nickel compound oxide in which some other metal element is substituted for a part of Ni of lithium nickel oxide, and a layered lithium-nickel compound oxide represented by formula (A) below is preferable.

$$Li_yNi_{(1-x)}M_xO_2 \quad (A)$$

(Herein, $0 \le x < 1$, $0 < y \le 1.2$, and M is at least one kind of element selected from the group consisting of Co, Al, Mn, Fe, Ti, and B.)

From a viewpoint of large capacity, content of Ni is preferably high, specifically, x is preferably less than 0.5 and more preferably 0.4 or less in formula (A). Such a compound includes, for example, $Li_\alpha Ni_\beta Co_\gamma Mn_\delta O_2$ ($0 \le \alpha \le 1.2$, preferably, $1 \le \alpha \le 1.2$, $\beta+\gamma+\delta=1$, $\beta \le 0.7$, and $\gamma \le 0.2$), $Li_\alpha Ni_\beta Co_\gamma Al_\delta O_2$ ($0 \le \alpha \le 1.2$, preferably, $1 \le \alpha \le 1.2$, $\beta+\gamma+\delta=1$, $\beta \ge 0.6$, preferably, $\beta \ge 0.7$, and $\gamma \le 0.2$), and includes $LiNi_\beta Co_\gamma Mn_\delta O_2$ ($0.75 \le \beta \le 0.85$, $0.05 \le \gamma \le 0.15$, and $0.10 \le \delta \le 0.20$) in particular. More specifically, for example, it is possible to preferably use $LiNi_{0.8}Co_{0.05}Mn_{0.15}O_2$, $LiNi_{0.8}Co_{0.1}Mn_{0.1}O_2$, $LiNi_{0.8}Co_{0.15}Al_{0.05}O_2$, $LiNi_{0.8}Co_{0.1}Al_{0.1}O_2$, and the like.

Furthermore, from a viewpoint of thermal stability, it is preferable that content of Ni is not more than 0.5, specifically, x is 0.5 or more in formula (A). It is also preferable that a particular transition metal is not more than half. Such a compound includes $Li_\alpha Ni_\beta Co_\gamma Mn_\delta O_2$ ($0 \le \alpha \le 1.2$, preferably, $1 \le \alpha \le 1.2$, $\beta\alpha\gamma+\delta=1$, $0.2 \le \beta \le 0.5$, $0.1 \le \gamma \le 0.4$, and $0.1 \le \delta \le 0.4$). More specifically, such a compound includes $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), $LiNi_{0.5}Co_{0.3}Mn_{0.2}O_2$ (abbreviated as NCM532), and the like (however, these compounds also include a fluctuation of approximately 10% in the content of each transition metal).

Moreover, two or more kinds of compounds represented by formula (A) may be mixed and used. For example, it is also preferable that NCM532 or NCM523 and NCM433 are mixed at 9:1 to 1:9 (2:1 as a typical example) and used. Further, it is also possible to configure a cell having large capacity and high thermal stability by mixing a material having a high content of Ni (x is 0.4 or less) and a material having a content of Ni of less than 0.5 (x is 0.5 or more, e.g., NCM433) in formula (A).

In addition to the above, a positive electrode active material includes, for example:
(a) lithium manganate having a layered structure or a spinel structure such as $LiMnO_2$, $Li_xMn_2O_4$ ($0<x<2$), $Li_2MnO_3$, or $Li_xMn_{1.5}Ni_{0.5}O_4$ ($0<x<2$), and a material in which other metals are substituted for some of the transition metals in these materials;
(b) $LiCoO_2$
(c) a material in which other metals are substituted for some of the transition metals in the materials of (a) and (b);
(d) a material in which Li is more excessive than in a stoichiometric composition in lithium transition metal oxide of (a), (b), and (c); and
(e) a material having an olivine structure such as $LiFePO_4$. Moreover, it is also possible to use
(f) a material in which Al, Fe, P, Ti, Si, Pb, Sn, In, Bi, Ag, Ba, Ca, Hg, Pd, Pt, Te, Zn, La or the like is substituted for some of the metal oxides in (a), (b), (c), (d), and (e).

It is possible to singly use one kind or use a combination of two or more kinds from any of the positive electrode active materials described above. It is also possible to use a radical material or the like as a positive electrode active material.

A negative electrode active material layer may contain at least 10 mass percent or more of a negative electrode active material including silicon or silicon oxide, and contain: a carbon material such as graphite, amorphous carbon, diamond-like carbon, fullerene, a carbon nanotube, and a carbon nanohorn; a lithium metal material; an alloy-based material of tin or the like; and an oxide-based material such as $Nb_2O_5$ and $TiO_2$.

A negative electrode active material is not particularly limited, and includes, for example, a carbon material which can occlude and release lithium ions, metal which can be alloyed with lithium, metal oxide which can occlude and release lithium ions, or a material in which the above materials are mixed, and the like.

A carbon material includes, for example, carbon, amorphous carbon, diamond-like carbon, a carbon nanotube, or a compound of the above, and the like. Herein, highly crystalline carbon is high in electric conductivity, and is satisfactory in bondability to a negative electrode collector made of metal such as copper, and in voltage flatness. On the other hand, low crystalline amorphous carbon is relatively small in cubical expansion, therefore has a high effect of lessening cubical expansion of the whole negative electrode, and is less subject to deterioration resulting from non-uniformity such as a crystal grain boundary or a defect.

A negative electrode containing metal or metal oxide is preferable in that energy density can be improved and in that capacity of a cell per unit weight or per unit volume can be increased.

Metal includes, for example, Al, Si, Pb, Sn, In, Bi, Ag, Ba, Ca, Hg, Pd, Pt, Te, Zn, La, or an alloy of two or more kinds of the above, and the like. Moreover, two or more kinds may be mixed and used from the above metals or alloys. Further, the above metals or alloys may include one or more kinds of nonmetallic elements.

Metal oxide includes, for example, silicon oxide, aluminum oxide, tin oxide, indium oxide, zinc oxide, lithium oxide, or a compound of the above, and the like. In the present example embodiment, as a negative electrode active material, tin oxide or silicon oxide is preferably contained, and silicon oxide is more preferably contained.

Moreover, not a single material but a mixture of a plurality of materials can be used for a negative electrode active material. For example, materials of the same kind such as graphite and amorphous carbon may be mixed together, or materials of different kinds such as graphite and silicon may be mixed together.

The positive electrode active material layers 9a and 9b and the negative electrode active material layers 11a and 11b are formed by including therein a positive electrode active material or a negative electrode active material and a binder, and a conductive assistant can be suitably added thereto. As a conductive assistant, one kind or a combination of two or more kinds can be used from carbon black, carbon fiber, graphite, and the like. Moreover, as a binder, it is possible to use polyimide, polyamide, polyacrylic acid, polyvinylidene fluoride, polytetrafluoroethylene, carboxymethyl cellulose, modified acrylonitrile rubber particles, and the like.

[Collector]

As the positive electrode collector 8, it is possible to use aluminum, stainless steel, nickel, cobalt, titanium, gadolinium, an alloy of the above, or the like.

As the negative electrode collector 10, it is possible to use copper, stainless steel, nickel, cobalt, titanium, gadolinium, or an alloy of the above, and stainless steel in particular is preferable. As stainless steel, it is possible to use martensitic, ferritic, or austenitic-ferritic two-phase stainless steel, or the like. For example, as martensitic stainless steel, it is possible to use a JIS400 series, and SUS420J2 having a chromium content of 13%. As ferritic stainless steel, it is possible to use a JIS400 series as well, and SUS430 having a chromium content of 17%. As austenitic-ferritic two-phase stainless steel, it is possible to use a JIS300 series, SUS329J4L having a chromium content of 25%, a nickel content of 6%, and a molybdenum content of 3%, or a composite alloy of the above.

[Separator]

The separator 5 is not particularly limited as long as the separator 5 is a nonwoven fabric, a microporous membrane, or the like that is generally used in a nonaqueous electrolytic solution secondary cell. As a material of the separator 5, it is possible to use, for example, polyolefin resin such as polypropylene or polyethylene, polyester resin, acrylic resin, styrene resin, nylon resin, or the like. A polyolefin-based microporous membrane in particular is satisfactory in ion permeability and performance of physically isolating a positive electrode and a negative electrode, and is therefore preferable. Moreover, when necessary, a layer containing inorganic particles may be formed on the separator 5. Inorganic particles include, for example, insulating oxide, nitride, sulfide, carbide, and the like. Particularly, inorganic particles preferably contain $TiO_2$ and $Al_2O_3$. Moreover, it is also possible to use high melting point flame-resistant resin such as aramid and polyimide. In terms of increasing an impregnation property of electrolytic solution, it is preferable to select such a material that a contact angle between electrolytic solution and the separator 5 is small. In order to provide satisfactory ion permeability and maintain proper piercing strength, the thickness of the separator 5 is preferably 5 to 25 μm, and further preferably 7 to 16 μm.

[Trench]

Figure 5:
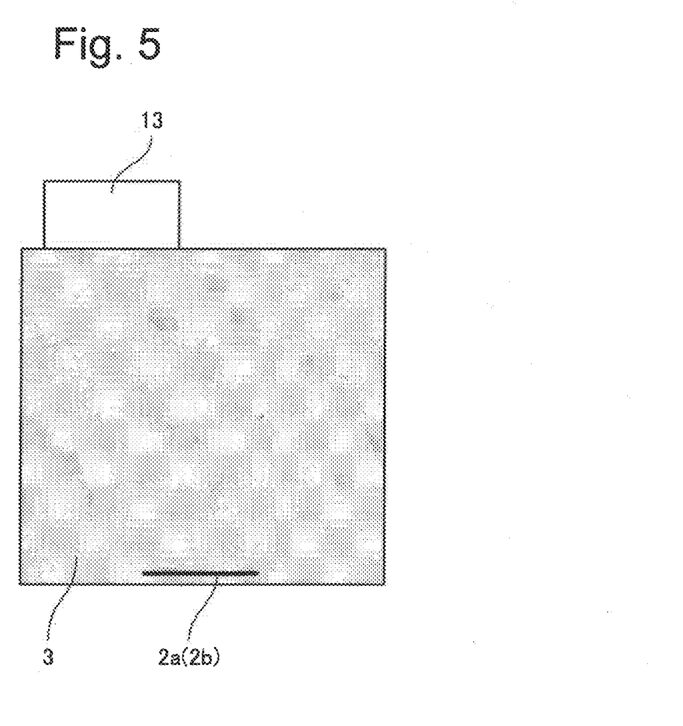
FIG. 5 is a top view of a negative electrode of another example embodiment of the present invention.
Figure 6A:
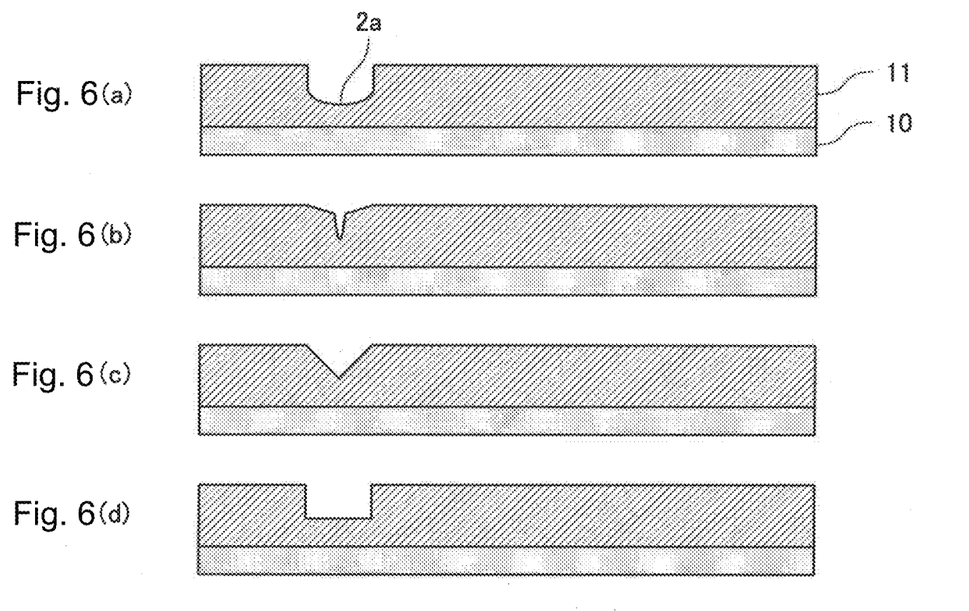

The trenches 2a and 2b provided in the negative electrode 3 are located 0.1 mm or more and 2 mm or less outward from each side of the positive electrode 4 facing the negative electrode 3, and have a depth which is 10% or more and 90% or less of the thickness of the negative electrode active material layer 11a (or 11b) from a surface of the negative electrode active material layer 11a (or 11b). In addition, the trenches 2a and 2b are desirably provided on all of the sides of the negative electrode 3, but may be provided in only one portion of one side as illustrated in FIG. 5. Even a trench formed only in one portion can relax stress resulting from cubical expansion there. Moreover, stress on a facing side and an adjacent side can also be partly released to the trench and thus relaxed.

Figure 7A:
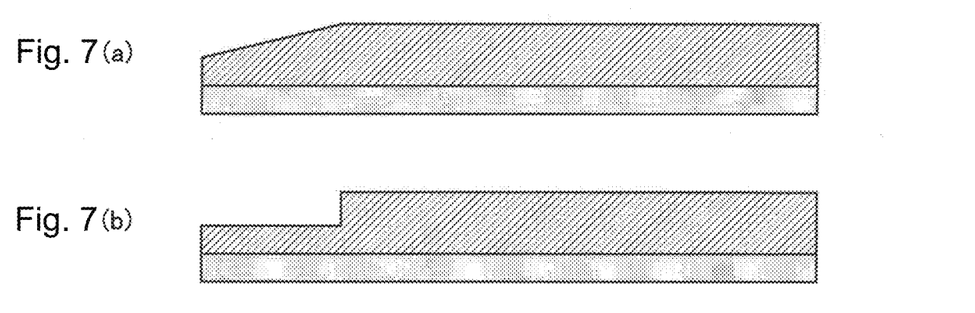

Cross-sectional shapes of the trenches 2a and 2b may be shapes illustrated in FIGS. 6(a) to 6(d), instead of a U-shape illustrated in FIG. 3, specifically, a shape which has substantially constant width from an electrode surface side to a collector side and is sharply narrowed in width in a curved form in an area close to a bottom. Moreover, the cross-sectional shapes do not need to be a trench-shape, and may be a shape in which an outer edge of a negative electrode active material layer has an outward inclination or cutout as illustrated in FIGS. 7(a) and 7(b). A cross-sectional shape forming a thin section is only needed.

As a method of forming the trenches 2a and 2b, it is possible to use various methods, such as a forming method in which a negative electrode active material layer is uniformly applied and then pressed with a trench-shaped die, and a forming method in which a negative electrode active material layer is uniformly applied and then chipped with a sharp jig such as a cutter blade or the like.

(Description of Manufacturing Method)

Next, a method for manufacturing the stacked type lithium-ion secondary cell 1 according to one example embodiment of this invention is described.

First, manufactured as electrodes for a secondary cell are a positive electrode 4 in which both sides of a positive electrode collector 8 are coated with positive electrode active material layers 9a and 9b, and a negative electrode 3 in which both sides of a negative electrode collector 10 are coated with negative electrode active material layers 11a and 11b, as illustrated in FIG. 3. Specifically, a positive electrode collector 8 is coated with predetermined amounts of positive electrode active material layers 9a and 9b. Then, the positive electrode active material layers 9a and 9b on the positive electrode collector 8 are pressed with suitable pressure. In a similar way, a negative electrode collector 10 is coated with negative electrode active material layers 11a and 11b, and then the negative electrode active material layers 11a and 11b are pressed. Further, trenches 2a and 2b are formed at positions 0.1 mm or more and 2 mm or less outward from each side of the positive electrode 4 facing the manufactured negative electrode 3 by being pressed with a trench-shaped die, in such a way that depth of the deepest portion is 10% or more and 50% or less of the thickness of the negative electrode active material layer 11a (or 11b) from a surface of the negative electrode active material layer 11a (or 11b). The trenches are provided on both surfaces of the negative electrode collector 10. The trench 2a is provided in the negative electrode active material layer 11a, and the trench 2b is provided in the negative electrode active material layer 11b. The positive electrode 4 and the negative electrode 3 manufactured as above are alternately stacked with a separator 5 interposed therebetween, and an electrode stack 6 is thus formed. The number of layers of positive electrodes 4 and negative electrodes 3 to be stacked is determined depending on a purpose of a secondary cell and the like.

Then, as illustrated in FIG. 2, film outer packages 7a and 7b are laid over each other outside the electrode stack 6. Further, except for a portion to be an unillustrated injection hole, outer peripheral portions of film outer packages 7a and 7b laid over each other are joined to each other by, for example, welding. A pair of a positive electrode terminal 12 and a negative electrode terminal 13 are connected to the positive electrode 4 and the negative electrode 3, respectively, and extended to the outside of the film outer package 7. In parts through which the positive electrode terminal 12 and the negative electrode terminal 13 pass, the film outer packages 7a and 7b are not welded together directly, but the positive electrode terminal 12 and each of the film outer packages 7a and 7b are joined together, and the negative electrode terminal 13 and each of the film outer packages 7a and 7b are joined together. The film outer packages 7a and 7b are firmly joined together around the positive electrode terminal 12 and the negative electrode terminal 13, and thereby sealed substantially without any space therebetween.

Then, in a state where the electrode stack 6 is stored in the film outer package 7 sealed except for the injection hole, unillustrated electrolytic solution is injected into the film outer package 7 from the injection hole. Unjoined portions of the outer peripheral portions of the film outer packages 7a and 7b are joined to each other by welding or the like, in such a way that the injection hole of the film outer package 7 storing the electrode stack 6 and the electrolytic solution is sealed. Consequently, the film outer package 7 is sealed over the whole periphery.

(Alternative Example Embodiments)

In the example embodiment described above, the trenches 2a and 2b are desirably on all of the sides of the negative electrode 3, but may be provided on only one side or in only one portion of one side. FIG. 5 is a top view illustrating an example of a negative electrode in which a trench is provided in only one portion of one side. In the example of FIG. 5, length of the trench is approximately ¼ of one side, and ¹⁄₁₆ of the entire length of an outer periphery. Alternatively, a plurality of trenches may be discontinuously formed.

Further, in FIG. 3, the trenches 2a and 2b having the same U-shape are formed in both of the negative electrode active material layers 11a and 11b, respectively. However, trenches having cross-sectional shapes differing between the negative electrode active material layers 11a and 11b or trenches having a planar shape may be formed. Note that the positions of the trenches 2a and 2b may be slightly out of alignment.

A trench may be formed in only one of the negative electrode active material layers 11a and 11b. When an outermost layer is the negative electrode as in FIG. 3, forming a trench on the 11a side closer to the positive electrode 4 is more effective in relaxation of stress.

Although the negative electrode active material layers are formed on both of the upper and lower surfaces of the negative electrode collector 10 in FIG. 3, a negative electrode active material layer may be formed only on a side facing the positive electrode active material layer 9b. A positive electrode active material layer may also be formed only on the positive electrode active material layer 9b facing the negative electrode active material layer 11a in a similar manner.

Although the positive electrode 4 and the negative electrode 3 are single layers in the case illustrated in FIG. 3 for simplification of description, the present invention is also applicable to the case where a plurality of positive electrodes 4 and negative electrodes 3 are stacked. In the case of a plurality of electrodes, a necessary number of layers need only to be further stacked sequentially under the negative electrode active material layer 11b in FIG. 3, in such a way as a separator 5, a positive electrode 4, a separator 5, a negative electrode 3 in which a trench 2 is provided, and so on.

Further, cross-sectional shapes of the trenches 2a and 2b may be a wedge shape or a polygonal shape instead of the U-shape illustrated in FIG. 3, and configurations for such shapes are illustrated in FIGS. 6(a) to 6(d). While a cross-section is U-shaped in FIG. 6(a), a cross-section may be wedge-shaped in FIG. 6(b), specifically, a cross-sectional shape may be gently inclined linearly on an electrode surface side, and steeply inclined like a wedge to a collector side at a certain depth. Note that an area which is gently inclined linearly on the electrode surface side does not need to be provided. An alternative may be a ditch having a triangular shape, specifically, a triangular cross-sectional shape which is wide on an electrode surface side and sharp on a collector side as in (c). Another alternative may be a ditch having a rectangular shape, specifically, a rectangular cross-sectional shape which has the same cross-sectional width from an electrode surface side to a collector side and has a flat bottom surface as in (d). With the same width and depth, a U-shape or a rectangular shape provides a larger volume, and allows an expanded volume to be absorbed as much.

Furthermore, instead of being provided with a trench, the negative electrode active material layer may be provided with an outward inclination or cutout as illustrated in FIGS. 7(a) and 7(b). FIG. 7(a) illustrates an example in which an inclination is provided, and FIG. 7(b) illustrates an example in which a cutout is provided. When an inclination or a cutout is provided, mass productivity is improved. This is because in the case of FIGS. 7(a) and 7(b), the negative electrode active material layer needs only to be chipped, and production is easier than in FIGS. 6(a) and 6(d).

Although electrolytic solution is used in the example embodiment described above, it is also possible to use solid electrolyte containing electrolyte salt, polymer electrolyte, solid or gel-like electrolyte in which electrolyte salt is mixed or dissolved in a polymer compound or the like, and the like. Each of these electrolytes can also serve as a separator.

Although the cell having a stacked type electrode structure has been described in the above example embodiment, the present invention is also applicable to a wound type electrode structure, and also applicable to a cell in a cylindrical or square form.

Although the example embodiment described above is intended for a lithium-ion secondary cell, the present invention is also advantageously applied to a secondary cell other than a lithium-ion cell.

EXAMPLE

Next, advantageous effects of one example embodiment are described by use of a specific example and a comparative example.

Example

[Production of Positive Electrode]

A positive electrode mixture is prepared by uniformly mixing 93 wt % over-lithiated nickel lithium manganate ($Li_{1.2}Ni_{0.2}Mn_{0.6}O_2$), 3 wt % powdered polyvinylidene fluoride, and 4 wt % powdered graphite. Positive electrode mixture slurry is produced by dispersing the prepared positive electrode mixture into N-methyl-2-pyrrolidone (NMP). The positive electrode mixture slurry is uniformly applied to one side of aluminum (Al) foil serving as a positive electrode collector, dried at approximately 120° C., and then formed and pressurized by a punching die and a pressing machine. Thereby, a rectangular positive electrode is formed.

[Production of Negative Electrode]

A negative electrode mixture is prepared by uniformly mixing 86 wt % carbon-coated silicon oxide (SiOC), 13 wt % polyimide binder, and 1 wt % powdered graphite, and dispersed into N-methyl-2-pyrrolidone (NMP) to thereby form negative electrode mixture slurry. Then, the negative electrode mixture slurry is uniformly applied to one surface of stainless steel (SUS) foil serving as a magnetic negative electrode collector, dried at approximately 90° C., and further subjected to nitrogen substitution and dried at 350° C. After this, a rectangular negative electrode is formed by a punching die. Note that the outer dimension of the negative electrode is set 1 mm larger than the outer dimension of the positive electrode. Further, a negative electrode active material layer is chipped off in such a way that a wedge-shaped trench having a depth of 3 µm (deepest portion) and a width of 0.5 mm is formed at a position 0.1 mm outward from a positive electrode facing part, and the trench is formed on all sides of the negative electrode. The thickness of the negative electrode active material layer is set to 22.5 µm. Since the thickness of a negative electrode collector (SUS) is set to 8 µm, the layer thickness of the whole negative electrode is 30.5 µm. Therefore, depth of the trench is 13% (=3/22.5).

While a nonaqueous polyimide binder is used herein, an aqueous binder such as styrene butadiene copolymer (SBR), sodium carboxymethyl cellulose (CMC), a mixture of SBR and CMC, polyacrylic acid (PAA), or the like may be used instead.

[Production of Electrolytic Solution]

Electrolytic solution is produced by mixing ethylene carbonate (EC) and a fluorine compound or the like in a weight ratio of 2:8, and dissolving 0.8 mol/L of $LiPF_6$ (EC/TTFP/FE1=2/3/5 (volume ratio)). Herein, TTFP is Tris (2, 2, 2-trifluoroethyl) phosphate, and FE1 is 1, 1, 2, 2-tetrafluoroethyl 2, 2, 3, 3-tetrafluoropropyl ether.

[Production of Stacked type Nonaqueous Electrolytic Solution Secondary Cell]

A positive electrode to which a positive electrode terminal is connected, and a negative electrode to which a negative electrode terminal is connected are stacked with a separator interposed therebetween, in such a way that active material layer surfaces of the electrodes face each other, and an electrode stack is thus produced. At a time of lamination, the electrodes are stacked in such a way that a clearance between a positive electrode end and a negative electrode end is 1 mm on each side. In other words, the negative electrode is set to be 1 mm larger than the positive electrode on each side. The stacked electrode stack is interposed between film outer packages of an aluminum stack, an outer periphery excluding an injection hole is thermally welded, the produced electrolytic solution is injected from the injection hole, the injection hole is then sealed by thermal welding, and a stacked type lithium-ion secondary cell is produced.

Comparative Example

A stacked type lithium-ion secondary cell is produced as in the example by use of a negative electrode having no trench. The stacked type lithium-ion secondary cells produced in the example and the comparative example are subjected to, under an environment at 45° C., constant current charging up to 4.7 V at a current value of 0.1 C, and constant current discharging up to 1.5 V at a current value of 0.1 C. Note that C is a unit indicating a relative current amount, and 0.1 C is a current value at which when a cell having a capacity of a nominal capacity value is subjected to constant current discharging, the discharge ends in just 10 hours.

Figure 8:
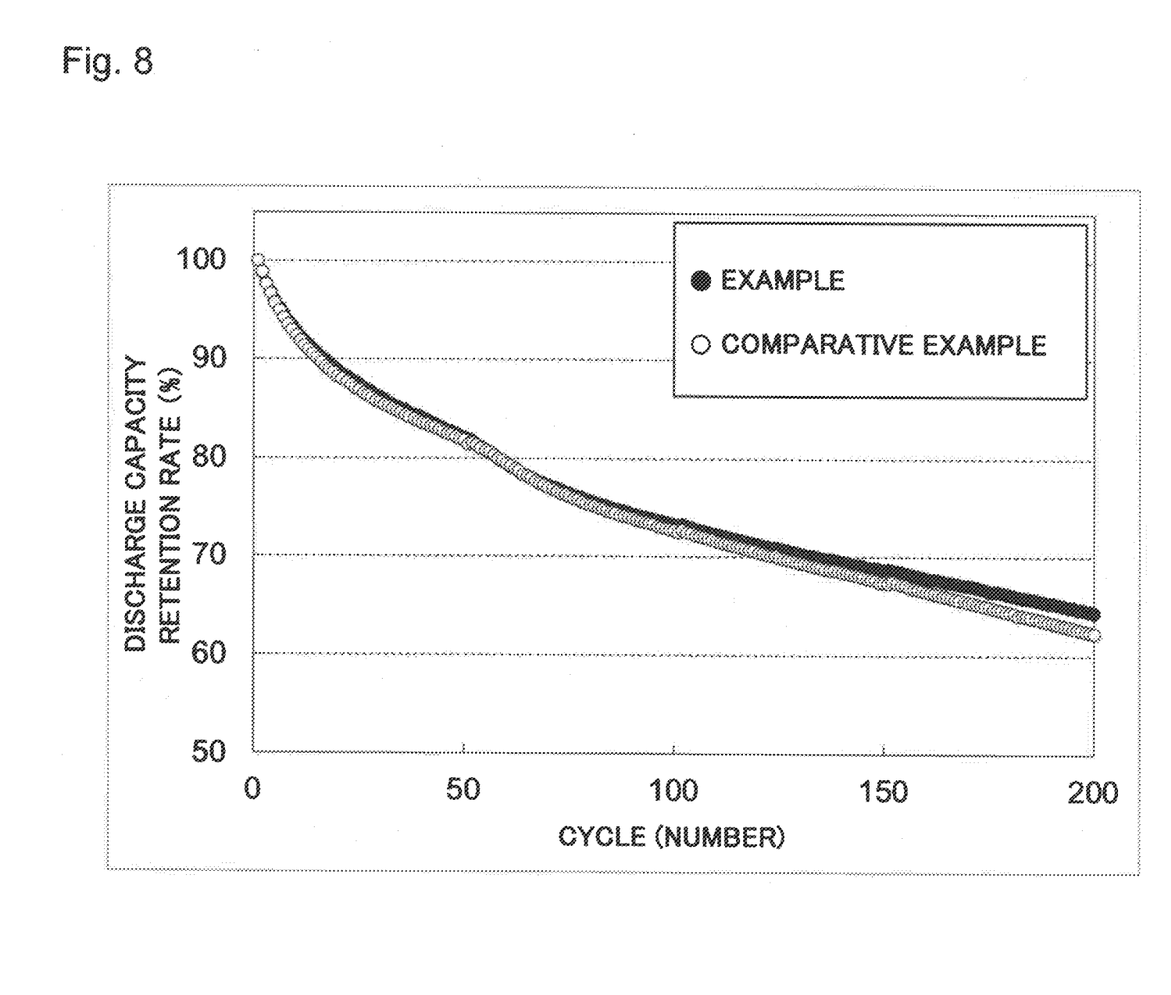
FIG. 8 is a graph illustrating cycle characteristics of an example of the present invention and a comparative example.

After this, a cycle characteristic evaluation is conducted, in which constant current charging up to 4.7 V at a current value of 0.2 C and constant current discharging up to 1.5 V at a current value of 0.2 C are repeated 200 times. An evaluation result is illustrated in FIG. 8. In FIG. 8, a discharge capacity retention rate is 62.3% in the comparative example, but is 64.4% in the present example, and a difference therebetween is 2.1% and significantly improved. Moreover, a discharge capacity retention rate after 200 cycles in the case where discharge capacity during one cycle is 100%, and a thickness increase rate after 200 cycles in the case where the thickness of a positive electrode facing surface end during one cycle is 100% are illustrated in Table 1. From Table 1, it can be seen that the thickness increase rate is 105.1% in the comparative example, but is 101.1% and 4% lower in the example.

From this result, it can be seen that both the discharge capacity retention rate and the thickness increase rate are improved by the present example.

TABLE 1

Discharge capacity retention rate and thickness increase rate after 200 cycles

|  | Discharge capacity retention rate | Thickness increase rate |
| --- | --- | --- |
| Example | 64.4% | 101.1% |
| Comparative example | 62.3% | 105.1% |

The example embodiment described above can also be partly or entirely described as in Supplementary notes below, but is not limited to the followings.

(Supplementary Note 1)

A secondary cell including:

a positive electrode in which a positive electrode active material layer is provided on a positive electrode collector; and a negative electrode in which a negative electrode active material layer is provided on a negative electrode collector, wherein the positive electrode active material layer and the negative electrode active material layer are stacked in such a way as to face each other with a separator interposed therebetween, the negative electrode active material layer has a larger area than the positive electrode active material layer, and a thin section is provided in at least a part of the negative electrode active material layer at a location of the negative electrode active material layer that does not face the positive electrode active material layer.

(Supplementary Note 2)

The secondary cell according to Supplementary note 1, wherein the thin section is located within 2 mm from an end of the positive electrode active material layer from a position immediately under an end of the positive electrode active material layer, and the deepest portion of the thin section has a depth which is 10% or more and 90% or less of the thickness of the negative electrode active material layer from a surface of the negative electrode active material layer.

(Supplementary Note 3)

The secondary cell according to Supplementary note 1 or 2, wherein the trench is formed over the whole periphery of the positive electrode.

(Supplementary Note 4)

The secondary cell according to any one of Supplementary notes 1 to 3, wherein the negative electrode active material layer includes silicon or silicon oxide.

(Supplementary Note 5)

The secondary cell according to any one of Supplementary notes 1 to 4, wherein the trench has a U-shaped, wedge-shaped, triangular, or rectangular cross-section.

(Supplementary Note 6)

The secondary cell according to any one of Supplementary notes 1 to 5, wherein the negative electrode has negative electrode active material layers formed on both surfaces of a collector, and the trench is formed on each of the negative electrode active material layers on both the surfaces.

(Supplementary Note 7)

The secondary cell according to any one of Supplementary notes 1 to 6, wherein the secondary cell is a lithium-ion secondary cell.

(Supplementary Note 8)

The secondary cell according to Supplementary note 7, wherein an active material included in the positive electrode active material layer is a layered oxide-based material which is Li transition metal oxide, a spinel-based material, an olivine-based material, an olivine fluoride-based material, a mixture of these materials, a vanadium oxide-based material, or a radical material.

(Supplementary Note 9)

The secondary cell according to Supplementary note 8, wherein an active material included in the negative electrode active material layer is silicon, silicon oxide, a carbon material, metal (including an alloy) which can be alloyed with lithium, metal oxide which can occlude and release lithium ions, or a material in which these materials are mixed.

(Supplementary Note 10)

The secondary cell according to any one of Supplementary notes 1 to 9, wherein a plurality of layers of electrode stacks in which the positive electrode, the separator, and the negative electrode are stacked in this order are stacked.

(Supplementary Note 11)

A method for manufacturing a secondary cell including: producing at least one electrode stack in which a positive electrode and a negative electrode are stacked with a separator interposed therebetween in such a way that active material layer surfaces face each other, the negative electrode including a trench in at least a part of a negative electrode active material layer having a larger area than a positive electrode active material layer, at a location that does not face the positive electrode active material layer; wrapping the electrode stack with an outer package except for an injection hole; and injecting electrolyte into the outer package from the injection hole.

(Supplementary Note 12)

A negative electrode used in a secondary cell, wherein an active material layer of the negative electrode has a larger area than a positive electrode active material layer, and includes a thin section in at least a part of a location that does not face the positive electrode active material layer.

The present invention has been described so far with the above example embodiment as an exemplar. However, the present invention is not limited to the example embodiment described above. In other words, various aspects that can be appreciated by a person skilled in the art are applicable to the present invention within the scope of the present invention.

INDUSTRIAL APPLICABILITY

The present invention is applicable to a power source of a mobile device such as a mobile telephone and a notebook personal computer, a power source of an electric vehicle such as an electric automobile, a hybrid car, an electric motorbike, and a power-assisted bicycle, a power source of a transportation medium for movement such as an electric train, a satellite, and a submarine, a power storage system for storing electricity, and the like.

REFERENCE SIGNS LIST

1 Stacked type lithium-ion secondary cell
2a, 2b Trench
3 Negative electrode
4 Positive electrode
5 Separator
6 Electrode stack
7a, 7b Film outer package
8 Positive electrode collector
9a, 9b Positive electrode active material layer
10 Negative electrode collector
11a, 11b Negative electrode active material layer
12 Positive electrode terminal
13 Negative electrode terminal
20 Electrode stack fastening tape

The invention claimed is:

1. A secondary cell comprising:
a positive electrode in which a positive electrode active material layer is provided on a positive electrode collector; and
a negative electrode in which a negative electrode active material layer is provided on a negative electrode collector, wherein
the positive electrode active material layer and the negative electrode active material layer are stacked in such a way as to face each other with a separator interposed therebetween, the negative electrode active material layer has a larger area than the positive electrode active material layer, and a thin section is provided in at least a part of the negative electrode active material layer at a location of the negative electrode active material layer that does not face the positive electrode active material layer,
the thin section is located within 2 mm from an end of the positive electrode active material layer from a position immediately under an end of the positive electrode active material layer, and a deepest portion of the thin section has a depth which is 10% or more and 90% or less of thickness of the negative electrode active material layer from a surface of the negative electrode active material layer.

2. The secondary cell according to claim 1, wherein the thin section is formed over a whole periphery of the positive electrode.

3. The secondary cell according to claim 1, wherein the negative electrode active material layer includes silicon or silicon oxide.

4. The secondary cell according to claim 1, wherein the thin section has a U-shaped, wedge-shaped, triangular, or rectangular cross-section.

5. The secondary cell according to claim 1, wherein the negative electrode includes negative electrode active material layers formed on both surfaces of a collector, and the thin section is formed on each of the negative electrode active material layers on the both surfaces.

6. The secondary cell according to claim 1, wherein the secondary cell is a lithium-ion secondary cell.

7. The secondary cell according to claim 6, wherein an active material included in the positive electrode active material layer is a layered oxide-based material being Li transition metal oxide, a spinel-based material, an olivine-based material, an olivine fluoride-based material, a mixture of these materials, a vanadium oxide-based material, or a radical material.

8. The secondary cell according to claim 7, wherein an active material included in the negative electrode active material layer is silicon, silicon oxide, a carbon material, metal (including an alloy) which can be alloyed with lithium, metal oxide which can occlude and release lithium ions, or a material in which these materials are mixed.

9. The secondary cell according to claim 1, wherein a plurality of layers of electrode stacks in which the positive electrode, the separator, and the negative electrode are stacked in this order are stacked.

10. A method for manufacturing a secondary cell, comprising:
producing at least one electrode stack in which a positive electrode and a negative electrode are stacked with a separator interposed therebetween in such a way that active material layer surfaces face each other, the negative electrode including a thin section in at least a part of a negative electrode active material layer having a larger area than the positive electrode, at a location that does not face the positive electrode;
wrapping the electrode stack with an outer package except for an injection hole; and
injecting electrolyte into the outer package from the injection hole,
wherein the thin section is located within 2 mm from an end of the positive electrode active material layer from a position immediately under an end of the positive electrode active material layer, and a deepest portion of the thin section has a depth which is 10% or more and 90% or less of thickness of the negative electrode active material layer from a surface of the negative electrode active material layer.

11. A negative electrode being used in a secondary cell, wherein
an active material layer of the negative electrode has a larger area than a positive electrode active material layer, and includes a thin section in at least a part of a location that does not face the positive electrode active material layer,
wherein the thin section is located within 2 mm from an end of the positive electrode active material layer from a position immediately under an end of the positive electrode active material layer, and a deepest portion of the thin section has a depth which is 10% or more and 90% or less of thickness of the negative electrode active material layer from a surface of the negative electrode active material layer.

* * * * *

UNITED STATES PATENT AND TRADEMARK OFFICE
CERTIFICATE OF CORRECTION

PATENT NO. : 10,680,271 B2
APPLICATION NO. : 15/781196
DATED : June 9, 2020
INVENTOR(S) : Takuya Hasegawa Page 1 of 1

It is certified that error appears in the above-identified patent and that said Letters Patent is hereby corrected as shown below:

In the Specification

Column 7, Example Embodiments, Line 2; Delete "$LiNiO_2$, $LiNiO_2$," and insert --$LiNiO_2$,-- therefor Column 7, Example Embodiments, Line 34; Delete "$\beta \leq 0.7$," and insert --$\beta \geq 0.7$,-- therefor Column 7, Example Embodiments, Line 47; Delete "$\beta\alpha\gamma+\delta=1$," and insert --$\beta+\gamma+\delta=1$,-- therefor Column 12, Example Embodiments, Line 27; Delete "and" insert --to-- therefor Signed and Sealed this
Seventeenth Day of November, 2020

Andrei Iancu
*Director of the United States Patent and Trademark Office*